May 4, 1965  V. FLAX  3,181,439
VALVED CONTAINERS OF FLEXIBLE PLASTIC MATERIAL
Filed Nov. 9, 1961  2 Sheets-Sheet 1
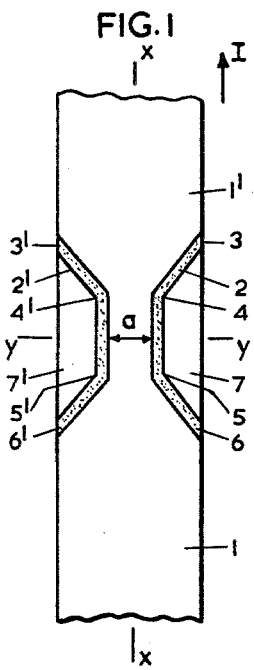
FIG.1
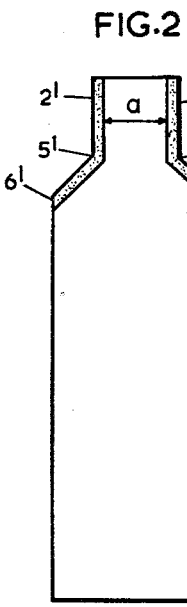
FIG.2
FIG.7
FIG.8
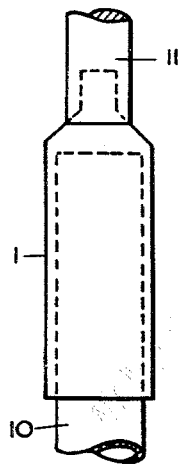
FIG.3
FIG.4
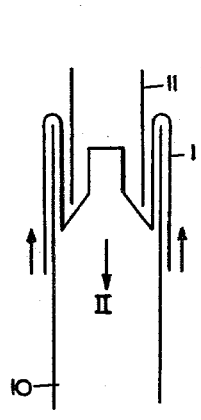
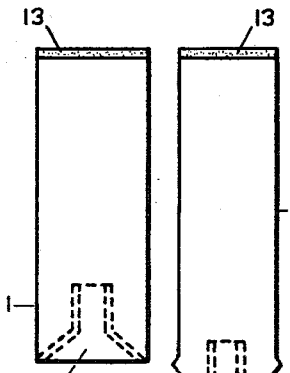
FIG.5  FIG.6
Inventor
VALER FLAX
By Holcombe, Wetherill + Brisebois
Attorneys May 4, 1965   V. FLAX   3,181,439
VALVED CONTAINERS OF FLEXIBLE PLASTIC MATERIAL
Filed Nov. 9, 1961   2 Sheets-Sheet 2

Inventor
VALER FLAX
By Holcombe, Wetherill & Brisebois
Attorneys

United States Patent Office 3,181,439
Patented May 4, 1965

3,181,439
VALVED CONTAINERS OF FLEXIBLE
PLASTIC MATERIAL
Valer Flax, Vic-Fezensac, Gers, France
Filed Nov. 9, 1961, Ser. No. 151,274
Claims priority, application Germany, Nov. 11, 1960,
C 22,716; France, May 24, 1961, 862,648
2 Claims. (Cl. 93—35)

This invention relates to containers of flexible plastic material for holding liquid, pasty or pulverulent material or gas, and which are usually of tubular shape, one of their ends being closed by a transversely extending weld. Such a container can have its other end also permanently closed by welding, but the present invention is concerned with containers of the type having at one end a valved mouthpiece which is so constructed as to allow the container to be filled through a tube inserted into said mouthpiece, but to prevent any discharge of fluid after extraction of the filling tube.

Various means have been provided for this purpose, some of them making use of resilient members which hold two lips of the mouthpiece against one another, while others rely upon the pressure of the fluid contained in the container upon the outer surfaces of said mouthpiece lips to hold them against one another, and form a self-closing valve. Devices of this latter character have been proposed which comprise a pair of tongues extending into the interior of the container and having characteristics such as to ensure their proper operation and oppose their discharge from the container. The production of this type of valve involves the additional manufacturing steps of welding the two tongues, inserting them into the container and then welding the walls of the container on both sides of the tongues. An alternative form of valved container has been proposed wherein the tongues are replaced by the turning back into the interior of the container of a corner of the container, the edges of this corner being welded together to form the valve. To fill these known valved containers, whose construction involves the formation of multiple welds, a filling tube is passed completely through the valve, with the result that the valve lips, after having once been forced apart by the tube, are liable not to bear accurately against one another, and thus no longer give perfect sealing-tightness.

The present invention provides a valved container of the above mentioned type but of a novel construction which avoids the aforesaid disadvantages.

The invention comprises a container of flexible plastic material, for holding liquid, pasty or pulverulent material or gas, having a valved filling opening adapted to be held closed by the pressure of the contents of the container, wherein said valved opening is constituted by an open-ended flattened tubular extension of the body of the container, which body is turned inside out over the extension so that the latter forms an integral reentrant neck within said body.

The invention further provides methods of making such containers, an improved manner of filling such containers, and an improved manner of using such containers for tamping shot holes.

Preferred embodiments of the invention are described below with reference to the accompanying drawings, in which:

FIGURE 1 is an elevation of a portion of flexible tube used in constructing one form of container in accordance with the invention;

FIGURE 2 is an elevation of a container blank cut from the tube of FIGURE 1;

FIGURES 3 and 4 are diagrammatic views showing successive stages in the formation of a container from the blank of FIGURE 2;

FIGURE 5 is an elevation of the container after it has been completed and before it is filled;

FIGURE 6 is an elevation of the container after filling;

FIGURES 7 and 8 are partial fragmentary views corresponding to part of FIGURE 2 and showing modifications;

Figure 9:
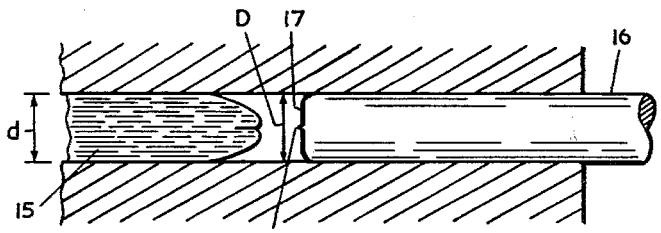
FIGURES 9 and 10 are axial sections of a shot-hole during and after introduction of tamping according to the invention.

Referring to the drawings and initially to FIGURES 1 to 6 thereof, one form of container according to the invention is formed from a portion 1 or 1' of flexible tube, preferably a seamless tube of synthetic material, for example polyvinylchloride, the internal surfaces of whose walls have a mirror-smooth finish, this being very desirable according to the invention.

As shown in FIGURE 1, a tube of the above character, which may have a length of as much as 100 metres, is progressively advanced in the direction of the arrow I and at intervals along the length of the tube equal to twice the length of a completed container the walls of the tube are secured together by bent lines of welding 2, 2'. These welds are situated symmetrically with respect to the longitudinal axis X—X of the tube, but are reversed in the lateral direction. Each welded part 2 or 2' begins at 3 or 3' on the edge of the flexible tube and extends obliquely inwards as far as the point 4 or 4', where there is an abrupt change of direction. From these points the welded parts extend substantially parallel to one another and at a distance apart $a$ equal to the width of neck opening required in the containers. As from the abrupt bends 5 and 5', the welded parts are again directed obliquely outwards and at 6 and 6' they again reach the edges of the flexible tube. The two welded parts 2 and 2' are produced practically at the same time. At the same time as the formation of these welded parts, the parts 7 and 7' isolated by the welds may be cut out of the flexible tube. If the tube is then cut out along the transverse line YY there is obtained a portion of flexible tube having a length equal to twice that of a container and having neck-like portions of reduced width at its front and rear ends. If such a portion of flexible tube is divided in the centre, two portions as shown in FIGURE 2 will be formed, each of these portions being used to form an individual container.

It is important that the parts 2 and 2' the section of which has been reduced by welding and which form the neck should be absolutely sealing-tight, and this can be effected without difficulty since there are at any time only two walls bearing on one another, and the walls of the neck will bear firmly on one another without any inclusion of air of any kind, the walls being fixed in this position by welds which reduce the section. The mirror-smooth inner surfaces of the neck walls assist the close application of the walls to one another and after the filling of the container they prevent the product which fills the container from being able to escape by capillary action through the neck.

To convert the externally projecting neck into a reentrant neck which will form a self-sealing valve, the procedure shown in FIGURES 3 and 4 is advantageously adopted, whereby the portion 1 of flexible tube is turned inside out over the neck, the latter remaining stationary, so that the walls of the neck can remain tightly against one another during the turning-over operation. To this end, the portion 1 of flexible tubing is fitted on to a rigid tube 10 and a portion of rigid tube 11 of a diameter smaller than that of the tube 10 is placed over the top end of the container and by movement in the direction of the arrow II in FIGURE 4 it is inserted inside the tube 10. The portion 1 of flexible tubing is thus turned over about the neck which is to act as a valve, without the neck undergoing any deformation. After turning-over (FIGURE 5), the neck which is obtained by section reduction by welding projects inside the container while at the same time a funnel 12 forms at the container neck end. This funnel 12 assists the introduction of a filling nozzle by means of which the container is filled after the end closure weld 13 has been made.

If the filling pressure inside the container is given a sufficiently high value and if the neck is made as is shown, part of the neck is pushed out again by the filling pressure, as shown in FIGURE 6, giving the container a tapered end portion 14. The ejection of the neck is limited by the abrupt bends 5, 5' in the longitudinal edges of the neck.

Modified forms of the section reducing welds which serve to produce a neck acting as a valve or flap are shown in FIGURES 7 and 8. In these forms also there are abrupt bends in the edges of the neck so that complete ejection of the neck by the internal pressure of the container is again avoided. The welds for the production of the neck by reduction of the section may naturally also have other shapes.

Figure 11A:
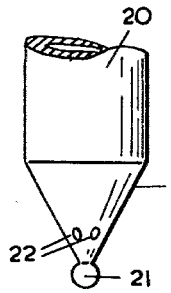
FIGURES 11a and 11b are views of an injection nozzle particularly adapted to the filling of containers according to the invention.

In order to avoid any risk that the operation of filling the container will affect the sealing-tightness of the valve after filling has been completed, it is proposed to replace the conventional filling tube which passes through the entire valve to discharge inside the body of the container, by a conical nozzle at a distance from its tip less than the total length of the valve which has a diameter greater than the diameter of the valve. As a result, when said nozzle is introduced into the valve mouthpiece, the nozzle penetrates through only a part of the length of the valve and does not separate the walls of the valve from one another at their inner ends; it is only when the liquid is injected under pressure through said nozzle that the pressure of the liquid moves the surfaces of the valve apart and penetrates into the container. As soon as the application of liquid ceases, the walls of the valve contact one another again and when the container is full of liquid the pressure of this liquid on the walls of the valve ensures complete sealing-tightness and prevents any leakage of the container. This filling nozzle is illustrated in FIGURES 11a and 1b of the drawing. As will be seen, the filling nozzle 0 has at its tip a globular swelling 21 to facilitate its introduction into the neck of the container and prevent any jamming of the very flexible walls of the latter. The liquid supply apertures 22 are disposed behind said swelling 21. The nozzle has a conical shape 23 which during filling closely matches the funnel-like neck entry so as to form a seal and prevent any loss of liquid during filling.

The container described above is not only useful for the packing of liquids and pastes but has an important application in the water tamping of shot-holes for blasting. When using for this purpose previously known containers of the type above defined it has been necessary to introduce the container into the shot-hole while is in an only partially filled state into the shot-hole and to complete its filling under pressure through the valve when it is already in place in the shot-hole. As result of its perfect sealing-tightness, the container according to the invention can be completely filled prior introduction into the shot-hole.

The present invention also provides a special manner closing the hole after the filled tamping has been put position. This new form of closure consists essentially of a washer of stiff material which is introduced after the water-tamping and which has a diameter slightly greater than the shot-hole so as to bear on the walls of the latter while providing a closure on blasting. For placing the washer in position there is provided a rigid mandrel having substantially the same diameter as the blast-hole adapted to position the washer in a plane perpendicular to the blast-hole axis while compressing the end of the tamping so that this compression, which results in a reduction of length, increases the diameter of the tamping, the walls of which are resilient, and thus ensure that the hole is perfectly drilled.

Figure 10:
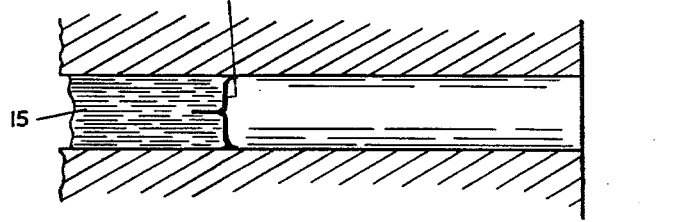
Figure 14:
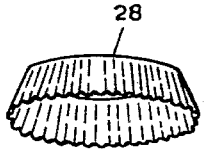
FIGURE 14 is a perspective view on a larger scale of a washer shown in FIGURES 9 and 10.

FIGURES 9 and 10 of the drawing show in axial section the position of the washer by means of the mandrel in the hole and respectively illustrate the parts during the advance of the mandrel and after withdrawal of the latter. FIGURE 9 shows the water-filled tamping 15, of a diameter $d$ slightly less than the diameter $D$ of the hole, and the mandrel 16 which serves to bring a washer 17 into contact with the tamping, the said washer being kept perpendicular to the axis of the hole against the end face of the mandrel which is preferably provided with an axial projection 18 cooperating with a corresponding recess in the washer. From FIGURE 10 it will be seen that once the washer 17 has been brought into contact with the tamping 15 and the mandrel 16 has been withdrawn, the washer holds the tamping axially compressed, thus resulting in its diametric expansion which brings it to a diameter $D$ in contact with the hole walls. FIGURE 14 is a larger-scale view of the washer 17 shown in FIGURES 9 and 10. It will be seen that this washer may preferably have a pleated or corrugated rim 28 in order that it may adapt itself to the irregularities of the blast-hole walls and thus engage them. This washer may be made by stamping from resilient sheet material, for example a slightly plasticised synthetic material.

The above described procedure for tamping blasting charges has the advantage that tampings can be put in position after having been completely filled beforehand, thus avoiding the difficult introduction of a filling lance through the valve to complete filling in situ. It also allows the washer 17 to be introduced at any time after the tamping has been introduced, thus enabling the tamping and compression operations to be combined when a large number of shot-holes are to be charged.

It should be noted that this method of using water-tampings is fundamental different from known procedures since it requires the complete filling of the tampings before their introduction into the hole, and that it is also fundamentally different from the use of tampings provided with restraining washers, since the washer which in this case is independent of the tamping can be introduced at any time after the introduction of the tamping and is brought into contact in the correct position without any possible mistake and at the time when the compression is exerted mechanically from outside upon the tamping in order to bring the latter into contact with the hole walls.

According to another variant of the tamping method according to the invention, the container may be jammed in the blast-hole by folding it over in the full state. After this folding operation, the container is embedded by means of the mandrel without it being necessary to insert a securing washer.

Figure 12:
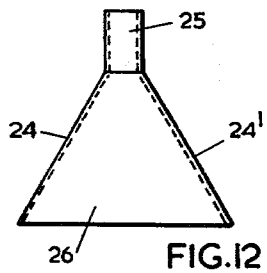
FIGURES 12 and 13 are views of another form of container according to the invention respectively during production and ready for use.
Figure 11B:
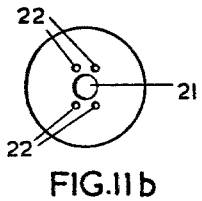
Figure 13:
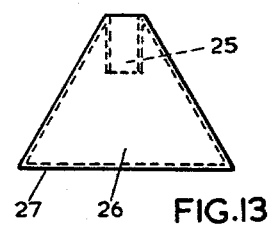

The invention is not limited to containers of cylindrical form, nor to containers made from tubular stock. A container of almost any desired shape may be made from two sheets which are connected by welding. It is also possible to dispose the neck outside the axis of symmetry. FIGURES 12 and 13 show by way of Example a container according to the invention of generally triangular shape, produced by applying side welds 24–24' to two superimposed sheets of plastic material, so as to define a neck 25 and a skirt 26 as shown in FIGURE 12. After this skirt has been turned over the neck, the latter is on the inside and the base of the container can then be welded as shown at 27 (FIGURE 13). It should be noted that the side welds 24–24' are then on the inside of the container.

It should also be noted that in all the embodiments the neck welds contain no reinforcement and do not result in any swelling or bulge inside the container.

Finally it is to be noted that the process of turning the container body inside out which brings the neck inside the container has yet another advantage when the container is made from transparent material and inscriptions are printed on the surface of the container. If such inscriptions are printed in reversed (mirror image) form on the outer surface of the body before the latter is turned inside out, they will appear, after the turning operation, in the desired form and being then inside the container they are not liable to be rubbed off by friction.

I claim:

1. A method of making a container which comprises the steps of forming an open-ended flattened tube having one end portion of lesser width than the remaining portion of the tube, turning said remaining portion inside out over said end portion, and welding together the walls of said remaining portion to close the other end of the container.

2. A method of making a container from a flattened length of seamless tubing which comprises the steps of forming a relatively narrow neck by sealing together the opposed sides of said flattened tube along lines extending first inwardly from each of the longitudinal edges thereof and then longitudinally toward one end of said length of tubing, pulling the remainder of said length of tubing inside out over said neck, and transversely sealing said tubing at a point longitudinally spaced from said neck.

References Cited by the Examiner

UNITED STATES PATENTS

| | | | |
|---|---|---|---|
| 172,039 | 1/76 | Lazarevitch | 150—9 |
| 1,480,894 | 1/24 | Cockburn | 102—30 |
| 2,164,690 | 7/39 | Struzik | 102—30 |
| 2,469,975 | 5/49 | McCloy | 53—29 |
| 2,696,342 | 12/54 | Toborg | 229—62.5 |
| 2,697,229 | 12/54 | Krueger. | |
| 3,009,498 | 11/61 | Fohr | 150—9 |
| 3,070,927 | 1/63 | Lundahl | 53—29 |

FOREIGN PATENTS

| | | |
|---|---|---|
| 1,134,946 | 8/62 | Germany. |
| 855,804 | 12/60 | Great Britain. |

FRANK E. BAILEY, *Primary Examiner.*

WALTER A. SCHEEL, FRANKLIN T. GARRETT, BERNARD STICKNEY, *Examiners.*